United States Patent
Prati et al.

(10) Patent No.: US 10,444,013 B2
(45) Date of Patent: Oct. 15, 2019

(54) MEMS GYROSCOPE WITH FREQUENCY REGULATION AND ELECTROSTATIC CANCELLATION OF THE QUADRATURE ERROR

(71) Applicant: STMICROELECTRONICS S.R.L., Agrate Brianza (IT)

(72) Inventors: Daniele Prati, Catania (IT); Carlo Valzasina, Gessate (IT); Tiziano Chiarillo, Tremestieri Etneo (IT); Pasquale Franco, Placanica (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 199 days.

(21) Appl. No.: 15/458,704

(22) Filed: Mar. 14, 2017

(65) Prior Publication Data

US 2018/0038692 A1     Feb. 8, 2018

(30) Foreign Application Priority Data

Aug. 2, 2016    (IT) .......................... 102016000081227

(51) Int. Cl.
*G01C 19/5712*     (2012.01)
*G01C 19/5776*     (2012.01)
*G01C 19/574*      (2012.01)

(52) U.S. Cl.
CPC ....... *G01C 19/5712* (2013.01); *G01C 19/574* (2013.01); *G01C 19/5776* (2013.01)

(58) Field of Classification Search
CPC .............. G01C 19/5712; G01C 19/574; G01C 19/5776

USPC ........ 73/504.12; 702/96, 104, 141, 145, 150
See application file for complete search history.

(56) References Cited

U.S. PATENT DOCUMENTS

| | | | |
|---|---|---|---|
| 6,067,858 A | 5/2000 | Clark et al. | |
| 2001/0039834 A1 | 11/2001 | Hsu | |
| 2008/0236280 A1* | 10/2008 | Johnson | ............. G01C 19/5719 73/504.14 |
| 2009/0064781 A1 | 3/2009 | Ayazi et al. | |

(Continued)

OTHER PUBLICATIONS

Tatar et al., "Quadrature-Error Compensation and Corresponding Effects of the Performance of Fully Decoupled MEMS Gyroscopes," *Journal of Microelectromechanical Systems* 21(3):656-667, 2012.

*Primary Examiner* — Peter J Macchiarolo
*Assistant Examiner* — Irving A Campbell
(74) *Attorney, Agent, or Firm* — Seed Intellectual Property Law Group LLP (57) ABSTRACT

A MEMS gyroscope, wherein a suspended mass is mobile with respect to a supporting structure. The mobile mass is affected by quadrature error caused by a quadrature moment; a driving structure is coupled to the suspended mass for controlling the movement of the mobile mass in a driving direction at a driving frequency. Motion-sensing electrodes, coupled to the mobile mass, detect the movement of the mobile mass in the sensing direction and quadrature-compensation electrodes are coupled to the mobile mass to generate a compensation moment opposite to the quadrature moment. The gyroscope is configured to bias the quadrature-compensation electrodes with a compensation voltage so that the difference between the resonance frequency of the mobile mass and the driving frequency has a preset frequency-mismatch value.

15 Claims, 8 Drawing Sheets

(56) References Cited

U.S. PATENT DOCUMENTS

2015/0114112 A1 4/2015 Valzasina et al.
2015/0377624 A1 12/2015 Falorni et al.

* cited by examiner

MEMS GYROSCOPE WITH FREQUENCY REGULATION AND ELECTROSTATIC CANCELLATION OF THE QUADRATURE ERROR

BACKGROUND

Technical Field

The present disclosure relates to a MEMS gyroscope with frequency regulation and electrostatic quadrature-error cancellation.

Description of the Related Art

As is known, microelectromechanical systems (MEMS) are increasingly used in various applications, by virtue of their small dimensions, costs compatible with consumer applications and increasing reliability. In particular, inertial sensors are formed, such as microintegrated gyroscopes and electromechanical oscillators using this technology.

MEMS devices of this type generally comprise a supporting body and at least one mobile mass, suspended over and coupled to the supporting body through springs, or "flexures". The springs are configured to enable the mobile mass to oscillate with respect to the supporting body according to one or more degrees of freedom. The mobile mass is capacitively coupled to a plurality of fixed electrodes on the supporting body, thus forming capacitors with variable capacitance. When the MEMS device operates as sensor, the movement of the mobile mass with respect to the fixed electrodes on the supporting body, due to the action of forces acting thereon, modifies the capacitance of the capacitors. This variation allows detection of the displacement of the mobile mass with respect to the supporting body and from the detected displacement the external force that has caused the displacement may be detected. On the contrary, when the MEMS device operates as an actuator, suitable biasing voltages are applied to the mobile mass, for example through a separate set of actuation or driving electrodes, so that the mobile mass is subjected to an electrostatic force that gives rise to the desired movement.

Among MEMS sensors, gyroscopes, in particular, have a complex electromechanical structure, which typically comprises at least two masses mobile with respect to the supporting body, coupled to each other so as to have a number of degrees of freedom depending upon the architecture of the system. In the majority of cases, each mobile mass has one or at most two degrees of freedom. The mobile masses are capacitively coupled to the supporting body through fixed and mobile sensing electrodes and through actuation or driving electrodes.

In an implementation with two mobile masses, a first mobile mass is dedicated to driving and is kept in oscillation at resonance frequency at a controlled oscillation amplitude. The second mobile mass is driven through the first mobile mass with (translational or rotational) oscillatory motion and, when the microstructure rotates about an axis of the gyroscope at an angular velocity, it is subjected to a Coriolis force proportional to the angular velocity itself and perpendicular to the driving direction. In practice, the second (driven) mobile mass acts as an accelerometer that enables detection of the Coriolis force and detection of the angular velocity.

In another implementation, a single suspended mass is coupled to the supporting body to be mobile with respect to the latter according to two independent degrees of freedom, namely, a driving degree of freedom and a sensing degree of freedom. The latter may enable a movement along the plane of the mobile mass (in-plane movement) or perpendicular thereto (out-of-plane movement). An actuating or driving device keeps the suspended mass in controlled oscillation according to one of the two degrees of freedom. The suspended mass moves on the basis of the other degree of freedom in response to rotation of the supporting body, due to the Coriolis force.

However, MEMS gyroscopes have a complex structure and non-ideal electromechanical interactions between the suspended mass and the supporting body frequently arise, for example due to production defects and process spread. Consequently, the useful signal components are mixed with spurious components, which do not contribute to the measurement of the angular velocity and are potential sources of noise, the effect whereof is not foreseeable.

For example, imperfections in the elastic connections between the suspended mass and the supporting body may cause oscillation of the suspended mass in a direction that does not perfectly coincide with the degrees of freedom desired in the design stage. This defect may also cause onset of a force having a component directed along the detection degree of freedom of the angular velocity. This force in turn generates a signal component of unknown amplitude, at the same frequency as the carrier and with a phase offset of 90° that causes an error, referred to as "quadrature error".

Figure 1A:
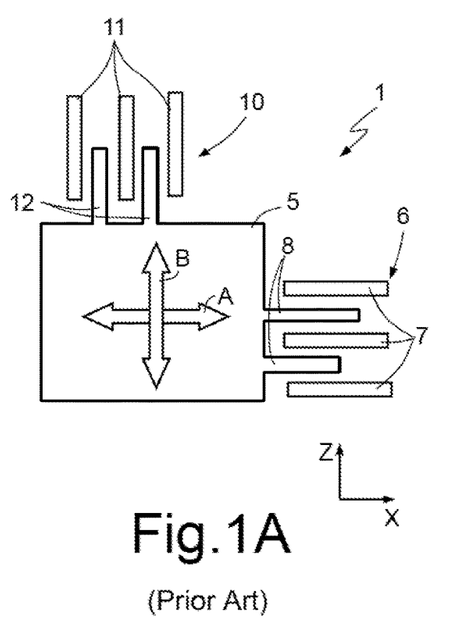
FIGS. 1A and 1B are schematic representations of the movements, respectively, of an ideal gyroscope and of a non-ideal gyroscope affected by quadrature error.
Figure 1B:
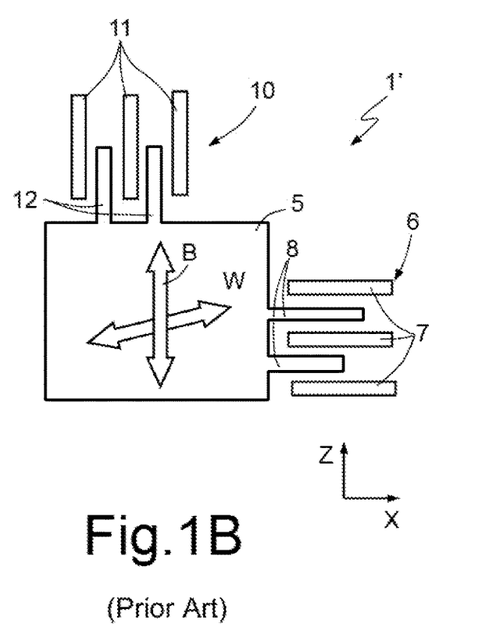

This effect may be appreciated from a comparison of FIGS. 1A and 1B, which represent, respectively, the movements of an ideal gyroscope 1 (FIG. 1A) and of a non-ideal gyroscope 1' subject to a quadrature error (FIG. 1B), where the gyroscopes 1, 1' are represented schematically, only as regards the parts discussed hereinafter.

The gyroscopes 1 and 1' have a sensing mass 5 driven through a driving unit 6, represented by fixed electrodes 7 (rigid with a substrate, not shown) and mobile electrodes 8 (rigid with the sensing mass 5) in a first direction (driving direction A, here parallel to axis X of a Cartesian reference system). A sensing unit 10, represented by fixed electrodes 11 (rigid with the substrate, not shown) and by mobile electrodes 12, rigid with the sensing mass 5, detects the movement caused by the Coriolis force in a second direction (sensing direction B, here parallel to axis Z of the Cartesian reference system).

In the ideal gyroscope 1, the sensing mass 5 is correctly driven in the driving direction A. In the non-ideal gyroscope 1', instead, the sensing mass 5 is driven in a transverse direction W, which has a driving component along the sensing direction B.

The spurious movement in the sensing direction B causes detection of the movement of the sensing mass 5 to be affected by a quadrature error.

To compensate the quadrature error, in known gyroscopes it is possible to act in various points of the sensing chain.

In particular, a solution that enables the gyroscope to have high stability both in temperature and over time is so-called electrostatic-cancellation method, consisting in providing electrodes under each suspended mass.

Figure 2:
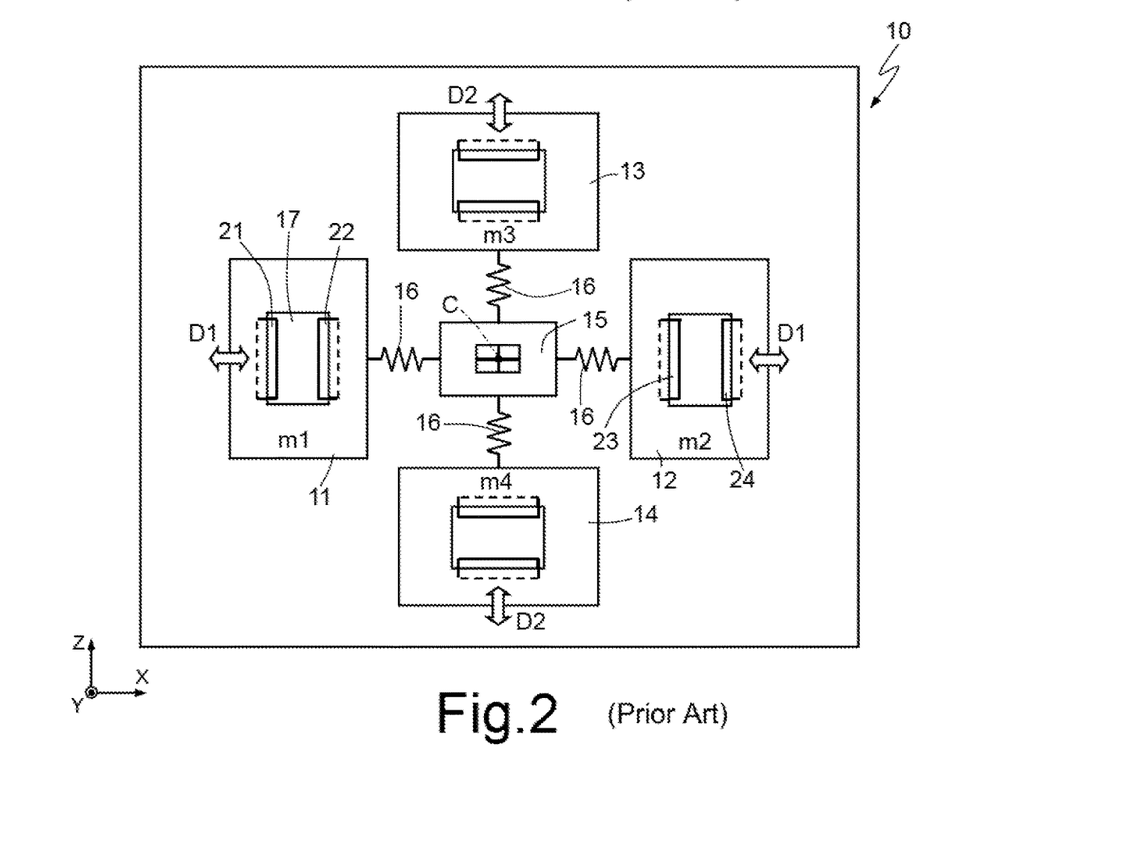
FIG. 2 is a simplified top plan view of a known gyroscope with quadrature-error compensation.

For example, FIG. 2 shows in a simplified way a gyroscope 10 having a suspended structure here forming four sensing masses 11, 12, 13 and 14. The sensing masses 11-14 here have a generally quadrangular shape, for example rectangular, and are arranged symmetrically, in pairs, with respect to a center C of the gyroscope 10 and parallel, in resting conditions, to the drawing plane (plane XZ). In particular, a first sensing mass 11 and a second sensing mass 12, having respective masses $m_1$, $m_2$, are driven along a first driving axis D1, here parallel to axis X and are arranged symmetrically to each other with respect to a second driving axis D2 (driving axis of a third and a fourth sensing mass 13, 14), perpendicular the first driving axis D1 and parallel to axis Y. The third and fourth sensing masses 13, 14 are arranged symmetrically to each other with respect to the first driving axis D1 and are driven along the second driving axis D2, as mentioned. Hereinafter, the description will refer only to the first pair of sensing masses 11, 12, but the following applies also to the second pair of masses 13, 14, obviously considering the respective driving and sensing axes.

The sensing masses 11, 12 are anchored to a substrate (not shown) through a plurality of elastic springs or springs, whereof the figure shows only the springs 16 arranged between the sensing masses 11-14, and a central mass 15, articulated to the substrate at a center C, so as to be rotatable about axes not shown, parallel to axes X, Y and extending through center C. The springs 16 provide the sensing masses 11, 12 with two degrees of freedom and more precisely enable a translation motion along the first driving axis D1 and a sensing motion, having a component in a vertical direction D3 parallel to the axis Z.

Figure 3:
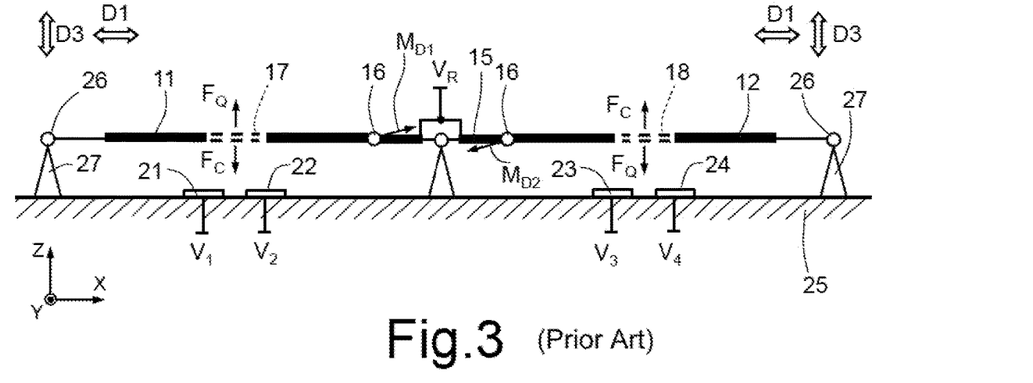
FIG. 3 is a schematic cross-section of the gyroscope with quadrature-error compensation of FIG. 2.

Each sensing mass 11, 12 has, in proximity of the centroid, an opening 17, 18, respectively. Two pairs of compensation electrodes 21, 22 and, respectively, 23, 24 are arranged underneath each opening 17, 18, shown in the schematic side view of FIG. 3. FIG. 3 also shows a substrate 25, extending underneath the plane of the suspended structure of FIG. 2, here represented schematically by its mechanical equivalents. In particular, here the springs 16 for connection to the central mass 15 are represented schematically as hinges, as are further springs 26, arranged at opposite ends of the sensing masses 11, 12 in the representation of FIG. 3 and connecting the mobile masses 11, 12 to a fixed structure 27, typically rigid with the substrate 25. The pairs of compensation electrodes 21, 22 and, respectively, 23, 24 are arranged in proximity of the respective openings 17, 18, represented dashed, so that each compensation electrode 21-24 extends half underneath the respective sensing mass 11, 12 and half underneath the respective opening 17, 18.

In presence of the quadrature error, the sensing masses 11, 12 are driven in non-ideal directions $M_{D1}$, $M_{D2}$ (FIG. 3) out of the plane of the gyroscope 10 (plane XZ of FIG. 2). In particular, the non-ideal directions $M_{D1}$, $M_{D2}$ may have components along the vertical sensing axis parallel to axis Z, here designated by D3. It follows that the gyroscope 10 of FIGS. 2, 3 may be subject to quadrature forces $F_Q$ (which are assumed as being the same for the two sensing masses 11, 12 and are here shown as applied at the ends of the sensing masses 11, 12 coupled to the central mass 15) such as to cause a rotation movement (not shown, see, however, FIG. 6A) of the sensing masses 11, 12 in the sensing direction D3.

The method of electrostatic quadrature-error cancellation comprises applying a respective compensation voltage V1, V2, V3, V4, of a d.c. type, to the compensation electrodes 21-24. In particular, applied compensation voltages V1-V4 have generally the following values:

$$V1=V3=VCM-\Delta V$$

$$V2=V4=VCM+\Delta V$$

where VCM and $\Delta V$ are determined in the calibration stage, for each gyroscope 10. The sensing masses 11, 12 are further biased at rotor voltage $V_R$.

In practice, the compensation electrodes 21-24 generate compensation forces $F_C$ (here represented as being applied in a median position with respect to the electrodes 21-24), aimed at mechanically balancing the quadrature forces $F_Q$, eliminating the movement due to quadrature error in the sensing direction D3.

This, however, does not solve the problem altogether. In fact, the compensation electrodes 21-24 increase the spreads due to asymmetries and the unbalancing in the gyroscope structure. Further, application of additional voltages increases the effect of electrostatic softening, i.e., the variation of the resonance frequency of these devices due to the change of elastic constant of the gyroscope caused by the potential difference existing between the mobile parts and the fixed parts. For example, in case of the electrostatic compensation discussed above, the effect of electrostatic softening may entail a sensible variation in the resonance frequency $f_0$ from 22 kHz to 18 kHz. This variation is normally referred to as "frequency mismatch".

On the other hand, the presence of a high frequency mismatch determines a marked variation of the sensitivity of the gyroscope and degradation of its performance.

In order to overcome the problem of frequency mismatch due to electrostatic softening, it is possible to introduce further frequency-tuning electrodes, one for each sensing axis of the gyroscope.

According to this approach, the gyroscope has fifteen electrodes (four electrodes for each sensing axis for quadrature error compensation, plus three electrodes for frequency mismatch compensation). Consequently, at least nine drivers 30, 31 and at least six DACs 32, 33 would be necessary, as shown in FIG. 4.

Figure 4:
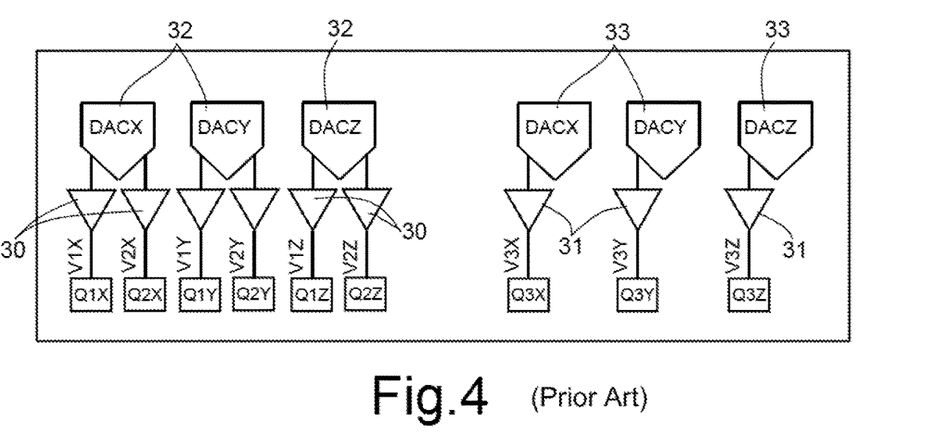
FIG. 4 shows a simplified circuit diagram of the driving circuitry for the gyroscope of FIGS. 2 and 3.
Figure 5A:
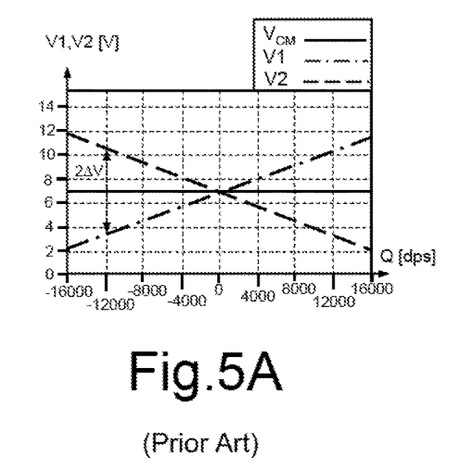
FIGS. 5A and 5B show compensation quantities usable with the gyroscope of FIGS. 2 and 3.

In fact, with this approach, the quadrature-error-cancellation electrodes, designated by Q1X, Q2X, Q1Y, Q2Y, Q1Z, Q2Z, are driven in a differential way, according to Eq. [1] provided hereinafter, through six driving circuits 30 and three DACs 32 (it should be noted that FIG. 4 shows only one of the two electrodes set at the same voltage). The differential voltage $2\Delta Vx$, $2\Delta Vy$, $2\Delta Vz$ applied to each pair of electrodes is optimized so as to generate a compensation quadrature $Q_{ei}$ which cancels out the quadrature error $Q_y$, for constant common-mode voltage VCM, as shown in FIG. 5A. In particular, FIG. 5A shows that, with this solution, the applied compensation voltage V1, V2 depends linearly upon the compensation quadrature $Q_{ei}$ to be generated.

Figure 5B:
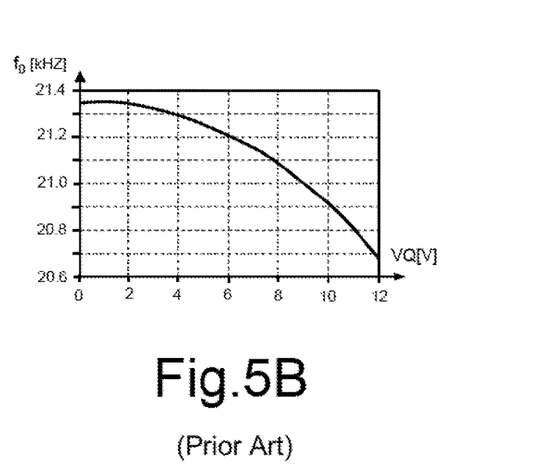

FIG. 5B shows, instead, the variation of the resonance frequency $f_0$ as a result of the electrostatic softening discussed above as a function of the applied tuning voltage VQ. As shown in FIG. 4, the tuning voltage VQ may be applied using three single-ended DACs 33.

This approach would cause an increase in the dimensions of the device due to the presence of the further electrodes Q3x, Q3y, Q3z and of the corresponding driving circuits (DACs 33 and buffers 31).

BRIEF SUMMARY

At least one embodiment of the present disclosure provides a solution able to overcome the drawbacks of the prior art.

According to the present disclosure, a MEMS gyroscope, a method for controlling a MEMS gyroscope and a method for setting compensation parameters in a MEMS gyroscope are provided.

In practice, the present gyroscope is configured so that the same quadrature-error compensation electrodes act so as to control also frequency mismatch. This is obtained by biasing the quadrature-error compensation electrodes with voltages that have a parabolic relation with the frequency mismatch, as discussed in detail hereinafter.

BRIEF DESCRIPTION OF THE SEVERAL VIEWS OF THE DRAWINGS

For a better understanding of the present disclosure, preferred embodiments thereof are now described, purely by way of non-limiting example, with reference to the attached drawings, wherein.

DETAILED DESCRIPTION

As mentioned, the present gyroscope is designed so that the compensation electrodes intended to cancel the quadrature error also regulate the frequency mismatch so that this has an imposed preset value.

Figure 6A:
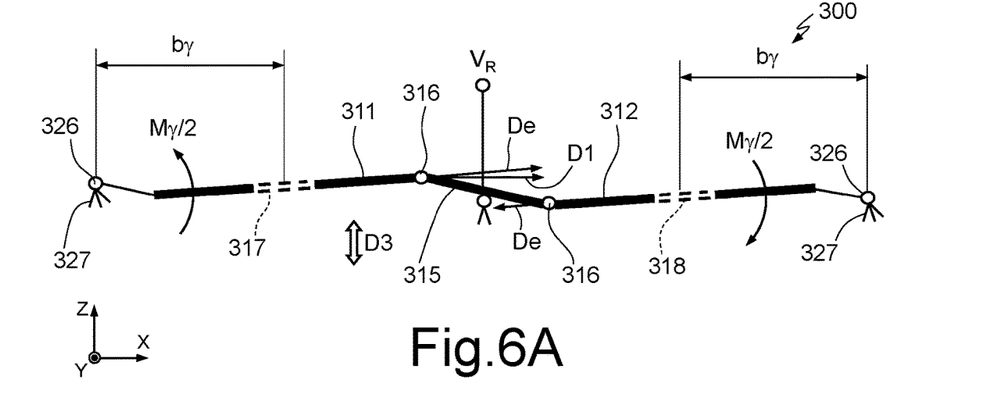
FIG. 6A is a schematic cross-section of a gyroscope having quadrature error.
Figure 6B:
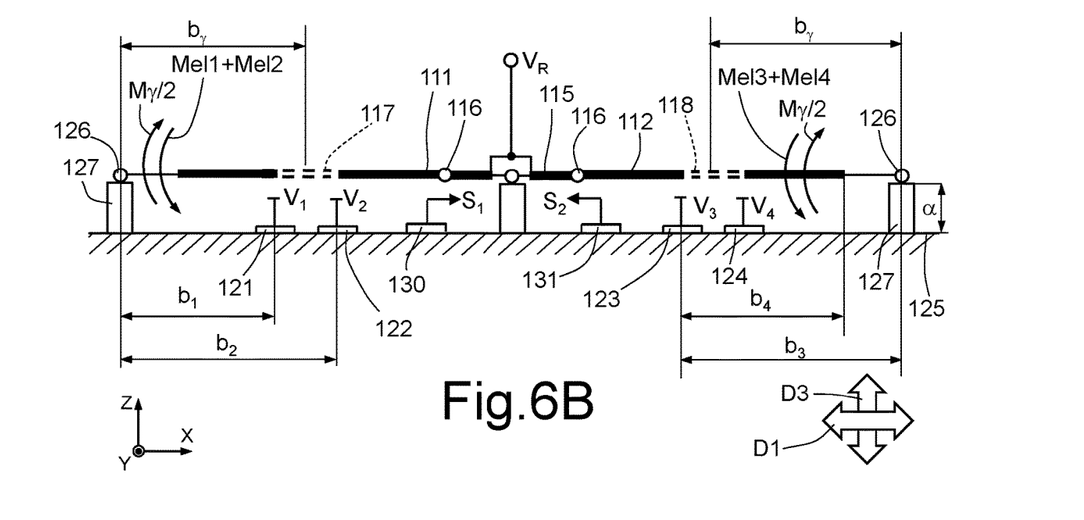
FIG. 6B is a schematic cross-section of an embodiment of the present gyroscope.

To this end, reference may be made to FIGS. 6A and 6B schematically showing, respectively, a non-compensated gyroscope 300 and a gyroscope 60 according to one embodiment of the disclosure, with quadrature-error compensation and frequency regulation. The gyroscopes 300, 60 have the same basic structure as the gyroscope 10 of FIGS. 2 and 3. Consequently, in FIGS. 6A-6C, the parts similar to those of FIG. 3 are designated in FIGS. 6B, 6C by the same reference numbers increased by 100 and in FIG. 6A by the same reference numbers increased by 300.

In detail (FIG. 6A), the gyroscope 300 comprises a pair of mobile masses 311, 312 extending, at rest, parallel to axes X and Y of a Cartesian space XYZ, driven in a driving direction D1 parallel to axis X and oscillating, as a result of the Coriolis force, so as to have a movement component directed in a sensing direction D3 parallel to axis Z. The mobile masses 311, 312 are articulated to a central mass 315 via first springs 316 and to a fixed structure 327 via second springs 326.

FIG. 6A shows the effect of a quadrature error on the system of masses 311, 312. As shown, the quadrature error is due to a spurious force $D_e$ having components in direction Z, acting on the two masses 311, 312 and generating a quadrature moment $M_\gamma$.

As may be noted, the quadrature moment $M_\gamma$ is applied for half of its value ($M_\gamma/2$) on each mobile mass 311, 312 and has an arm $b_\gamma$ equal to the distance of the centroid of each mobile mass 311, 312 from the verticals extending through the second springs 326. From FIG. 6A it may further be noted that this moment causes a rotation of each mobile mass 311, 312 in the opposite direction, due to their mutual connection through the first springs 316 and the central mass 315, as described in detail in U.S. patent application 2015/0114112, which is incorporated by reference herein in its entirety.

FIG. 6B shows a gyroscope 60 having a basic structure similar to that of the gyroscope 300 but having compensation structures. In particular, the gyroscope 60 has compensation electrodes 121-124, extending underneath the mobile masses 111, 112 and precisely underneath openings 117, 118 in the mobile masses 111, 112. The compensation electrodes 121-124 have the rectangular shape and dimensions shown in FIG. 6C and precisely have a length $L_0$ (in direction X parallel to the driving direction D1) and a width p (in direction Y). Further, the compensation electrodes 121-124 are arranged at a distance a from the mobile masses 111, 112, measured in direction Z.

FIG. 6B further shows fixed sensing electrodes 130, 131, which are arranged underneath and capacitively coupled to a respective mobile mass 111, 112. The fixed sensing electrodes 130, 131 supply output voltage signals s1, s2 correlated to the displacement of the mobile masses in the sensing direction D3, here oriented parallel to axis Z, in a known manner and not discussed herein.

FIG. 6B shows also the compensation moment $M_{el}$ generated by the compensation electrodes 121-124 on both of the mobile masses 111, 112 and aimed at setting the quadrature moment $M_\gamma$ to zero. In a manner not shown and described hereinafter, the compensation moment $M_{el}$ is given by the superposition of four components $M_{el1}$-$M_{el4}$, each generated by a respective compensation electrode 121-124. These components have respective arms $b_1$, $b_2$, $b_3$, $b_4$ equal to the distance of each compensation electrode 121-124 from the vertical extending through the respective second spring 126, for coupling to the fixed structure 127.

Figure 6C:
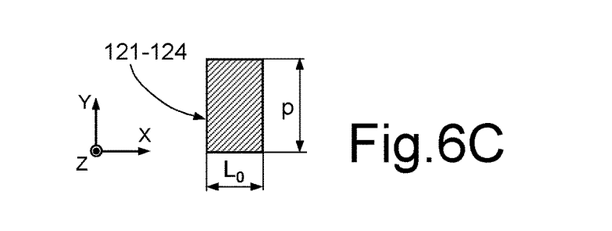
FIG. 6C is a top plan view of a detail of the gyroscope of FIG. 6B.

On these hypothesis, the overall compensation moment $M_{el}$ is equal to:

On these hypotheses, the overall compensation moment $M_{el}$ is equal to:

$$M_{el} = (M_{el1} + M_{el2}) - (M_{el3} + M_{el4}) \qquad [1]$$

where:

-continued $$M_{el1} = \frac{1}{2}\epsilon_0 \frac{\left(\frac{L_0}{2}+x_d\right)p}{a^2}(V_R-V_1)^2 b_1$$

$$M_{el2} = \frac{1}{2}\epsilon_0 \frac{\left(\frac{L_0}{2}+x_d\right)p}{a^2}(V_R-V_2)^2 b_{el2}$$

$$M_{el3} = \frac{1}{2}\epsilon_0 \frac{\left(\frac{L_0}{2}+x_d\right)p}{a^2}(V_R-V_3)^2 b_3$$

$$M_{el4} = \frac{1}{2}\epsilon_0 \frac{\left(\frac{L_0}{2}+x_d\right)p}{a^2}(V_R-V_4)^2 b_4$$

and $\epsilon_0$ is the vacuum dielectric constant; $L_0$, p are the dimensions of the compensation electrodes 121-124, shown in FIG. 6C; $x_d$ is the amplitude of the driving movement in direction D1; "a" is the distance between the compensation electrodes 121-124 and the plane of the mobile masses 111, 112 at rest; $V_R$ is the voltage applied to the central mass 115; $V_1$, $V_2$, $V_3$, $V_4$ are the compensation voltages applied to the compensation electrodes 121-124; and $b_1$, $b_2$, $b_3$, $b_4$ are the distances of the compensation electrodes 121-124 referred to above.

By setting $b_1=b_4$ and $b_2=b_3$ and applying compensation voltages $V_1=V_3$ and $V_2=V_4$ we obtain:

$$M_{el} = \frac{1}{2}\epsilon_0 \frac{\left(\frac{L_0}{2}+x_d\right)p}{a^2}b_1[(V_R-V_1)^2-(V_R-V_2)^2]+$$
$$-\frac{1}{2}\epsilon_0 \frac{\left(\frac{L_0}{2}-x_d\right)p}{a^2}b_2[(V_R-V_1)^2-(V_R-V_2)^2]=$$
$$\frac{1}{2}\epsilon_0 \frac{x_d p}{a^2}(b_1+b_2)[(V_R-V_1)^2-(V_R-V_2)^2]+$$
$$+\frac{1}{2}\epsilon_0 \frac{\frac{L_0}{2}p}{a^2}(b_1-b_2)[(V_R-V_1)^2-(V_R-V_2)^2]$$

Considering that $b_1 \cong b_2$, from the foregoing equation the compensation moment is given by $$M_{el} \cong \epsilon_0 \frac{x_d p}{a^2} b_1[(V_R-V_1)^2-(V_R-V_2)^2]. \quad [2]$$

The compensation moment $M_{el}$ may be used for setting to zero the quadrature moment $M_\gamma$ caused by the quadrature error $Q_\gamma$, generating a compensation quadrature $Q_{el}$ proportional to the compensation moment $M_{el}$. It may thus be written:

$$Q_{el}=k_Q[(V_R-V_1)^2-(V_R-V_2)^2] \quad [3]$$

where $$k_Q = k_1 \epsilon_0 \frac{x_d p}{a^2} b_1$$

is a proportionality constant linking the compensation quadrature $Q_{el}$ to the compensation moment $M_{el}$ that generates it.

As may be noted, the compensation quadrature $Q_{el}$ depends upon the compensation voltages $V_1$, $V_2$. Thus, by applying a differential voltage $\Delta V$ between the compensation electrodes 121 and 122 that is equal to the differential voltage applied between the compensation electrodes 123 and 124, it is possible to generate an electrostatic force that gives rise to a compensation moment $M_{el}$ depending upon the driving movement $x_d$ and upon the compensation voltages $V_1$, $V_2$. This electrostatic force may thus be used for eliminating the quadrature moment according to the following equality:

$$M_{el}+M_\gamma=0 \quad [4]$$

which corresponds to having $$Q_{el}+Q_\gamma=0 \quad [4']$$

As shown hereinafter, with an appropriate choice of the relation between $V_1$ and $V_2$, via the compensation electrodes 121-124, it is further possible to regulate the frequency mismatch.

In fact, application of the compensation voltages $V_1$-$V_4$ to the compensation electrodes 121-124 determines a variation of the overall elastic constant of the system of masses 111, 112 and thus the resonance frequency $f_s$. In particular, the resonance frequency $f_s$ is given by $$f_s = \frac{1}{2\pi}\sqrt{\frac{K_m-K_{el\_s}-K_{el\_q}}{J}} \quad [5]$$

where J is the moment of inertia, $K_m$ is the mechanical elastic constant, $K_{el\_s}$ is the electrostatic elastic constant due to the potential difference applied between the central mass 115 and the fixed sensing electrodes 130, 131 (FIG. 6B) and $K_{el\_q}$ is the electrostatic elastic constant due to the differential voltage applied between the central mass 115 and the compensation electrodes 121, 122, 123, 124.

In particular, the electrostatic elastic constant is given by:

$$K_{el\_q} = \frac{1}{2}\epsilon_0 \frac{\left(\frac{L_0}{2}+x_d\right)p}{a^3}(V_R-V_1)^2+$$
$$\frac{1}{2}\epsilon_0 \frac{\left(\frac{L_0}{2}-x_d\right)p}{a^3}(V_R-V_2)^2++\frac{1}{2}\epsilon_0 \frac{\left(\frac{L_0}{2}-x_d\right)p}{a^3}(V_R-V_3)^2+$$
$$\frac{1}{2}\epsilon_0 \frac{\left(\frac{L_0}{2}+x_d\right)p}{a^3}(V_R-V_4)^2$$

Considering that $V_1=V_3$ and $V_2=V_4$, we have:

$$K_{el_q} = \frac{1}{2}\epsilon_0 \frac{\frac{L_0}{2}p}{a^3}[(V_R-V_1)^2+(V_R-V_2)^2]== \quad [6]$$
$$k_S[(V_R-V_1)^2+(V_R-V_2)^2]$$

where $k_S = \frac{1}{2a^3}\epsilon_0 \frac{L_0}{2}p$.

From Eq. [6] it may be seen that the voltage variation on the electrodes 121-124 entails a change in the resonance frequency $f_s$. Thus, the frequency mismatch $\Delta f_0$ is equal to:

$$\Delta f_0 = f_s - f_d = \frac{1}{2\pi}\sqrt{\frac{K_m-K_{el\_s}-K_{el\_q}(V_1,V_2)}{J}} - f_d \quad [7]$$

Indicating with $$\omega_{SO}^2 = (K_m - K_{els})/J \quad [8]$$

and substituting Eq. [6] in Eq. [7], we obtain $$\Delta f_0 = \frac{1}{2\pi}\sqrt{\omega_{s0}^2 - \frac{k_S}{J}[(V_R - V_1)^2 + (V_R - V_2)^2]} - f_d \quad [9]$$

It should be noted that, in Eq. [9], $\omega_{SO}$ is the sensing resonance frequency when the compensation electrodes 121-124 are biased at $V_R$.

Eq. [3] shows that the compensation quadrature $Q_{el}$ depends upon the differential voltage between the electrodes 121-124, since the two terms in square brackets are subtracted. Instead, Eq. [9] shows that the frequency mismatch $\Delta f_0$ depends upon their common-mode voltage, since the same two terms in square brackets are added. It follows that, for a given quadrature error $Q_y$, it is possible to find a single pair of values of the compensation voltages $V_1$ and $V_2$ that compensate it and that enable the gyroscope 60 to work with the desired value of frequency mismatch $\Delta f_0$.

Figure 7:
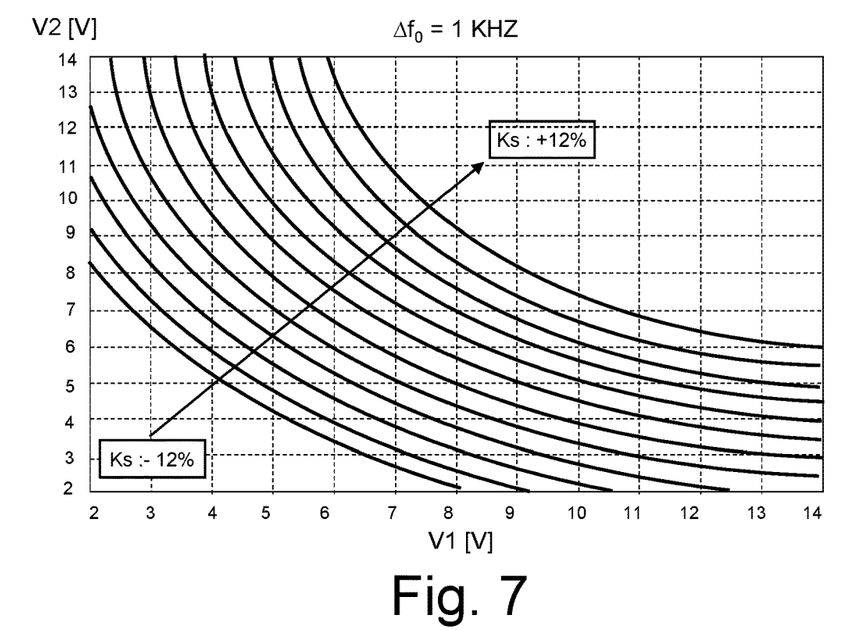
FIG. 7 shows the plots of electrical compensation quantities that may be used in the gyroscopes of FIG. 6B, for a desired value of frequency mismatch, as a function of the changes of the elastic characteristics of the gyroscope of FIG. 6B.
Figure 8:
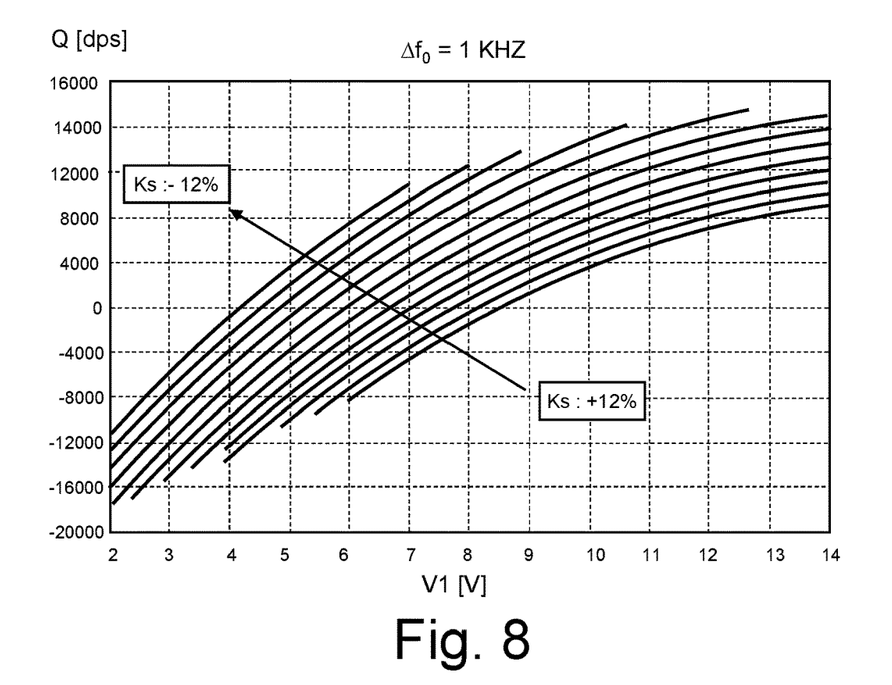
FIG. 8 shows the plots of the compensation quadrature $Q_{el}$ for a desired value of frequency mismatch, as a function of a compensation quantity and of the variation of the elastic characteristics of the gyroscope of FIG. 6B.

This is particularly clear considering FIGS. 7 and 8, which show the ratio between the compensation voltages $V_1$, $V_2$ applied to the compensation electrodes 121-124 in the gyroscope 60 of FIG. 6B for a preset value of the frequency mismatch $\Delta f_0$, here 1 kHz, and for different values of the elastic constant $k_s$, increasing from −12% (for the bottom curve) to 12% (for the top curve), with increments of 2%, of a theoretical expected value.

Figure 9:
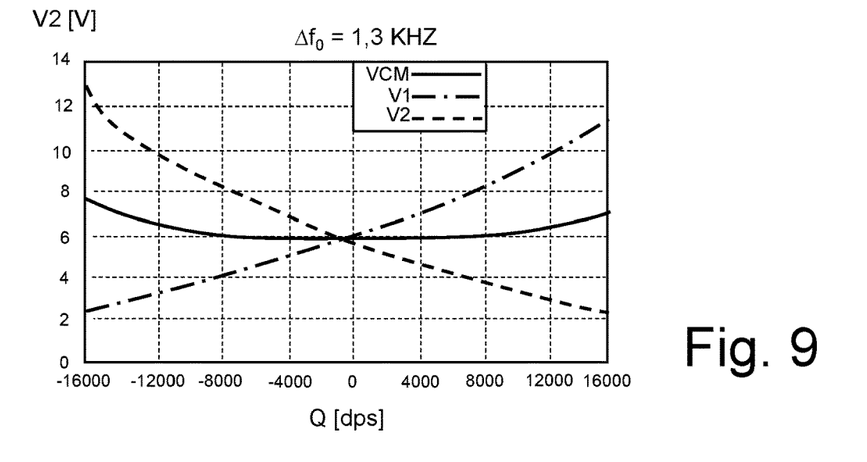
FIG. 9 shows the plot of the electrical compensation quantities used in the gyroscope of FIG. 6B as a function of the compensation quadrature.

It should be noted that the curves of FIGS. 7 and 8 correspond to applying compensation voltages $V_1$, $V_2$ that generate a compensation quadrature $Q_{el}$ equal in modulus to $Q_y$ and with opposite sign and follow the law represented in FIG. 9. As may be noted, the plot of the compensation voltages applied as a function of the frequency mismatch is no longer linear as in FIG. 5A, but is quadratic and the common-mode voltage is no longer constant.

The testing methodology used for the present gyroscope will be described hereinafter. In fact, Eq. [9] has are three unknowns: the driving frequency $f_d$, which may vary with respect to the design value, the sensing resonance frequency $\omega_{SO}$ and $k_s/J$. Of these, $f_d$ may be measured directly, whereas $\omega_{SO}$ and $k_s/J$ may be measured indirectly, by applying appropriate compensation voltages $V_1$, $V_2$ and measuring the frequency mismatch $\Delta f_0$.

Knowing the three variables $f_d$, $\omega_{SO}$ and $k_s/J$ and seeking the pair of values of the compensation voltages $V_1$, $V_2$ that provides a preset frequency mismatch $\Delta f_{0d}$, here 1 kHz, it is possible to understand which of the curves of FIG. 7 describes the behavior of a specific gyroscope 60 under test, i.e., which is the variation of the elastic constant $k_s$ affecting this gyroscope. Using the curves of FIG. 8 and the percentage variation of the value of the elastic constant $k_s$ thus determined, it is possible to determine the value of the first compensation voltage $V_1$ that cancels out the quadrature error $Q_y$. The value of the second compensation voltage $V_2$ may be thus obtained again from the identified previously curve of FIG. 7 or from Eq. [9].

Figures 10, 10A:
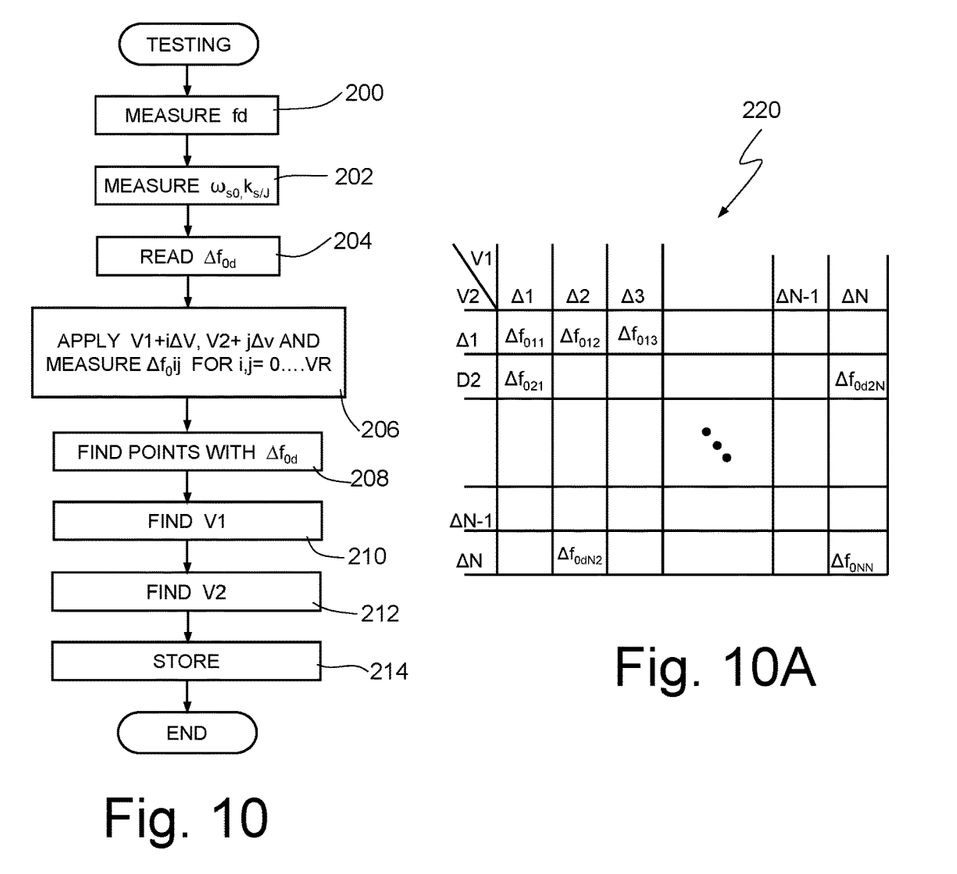
FIG. 10 shows a flowchart of a testing method for setting electrical compensation quantities for the gyroscope of FIG. 6B.
FIG. 10A shows a table used in the testing method of FIG. 10.

According to one aspect of the present description, during testing, each gyroscope 60 is tested to determine the values of the compensation voltages $V_1$, $V_2$ to be applied during operation. In particular, the test procedure may comprise the following steps (see also the flowchart of FIG. 10):

measuring the driving frequency $f_d$, step 200;

indirectly measuring the sensing resonance frequency $\omega_{SO}$ and the parameter $k_s/J$ by applying appropriate values of the compensation voltages $V_1$, $V_2$, as indicated above, step 202;

acquiring the desired value of the frequency mismatch $\Delta f_{0d}$ (this value is inversely correlated to the gain of the system and fixed in general in the design stage), step 204;

applying a plurality of values of the compensation voltages $V_1$, $V_2$, with steps $\Delta V$, for example, of 1 V, from 1 V to $V_R$ (e.g., 10 V) and measuring the corresponding values of the frequency mismatch $\Delta f_0$; the values thus obtained of the frequency mismatch $\Delta f_0$ are, for example, saved in a table 270 shown indicatively in FIG. 10A, step 206;

searching points in the table 220 that are characterized by the desired value of the frequency mismatch $\Delta f_{0d}$, step 208; the set of these points represents in practice the curve (from among the ones shown in FIG. 7) corresponding to the variation of the elastic constant $k_s$ that may be applied for the gyroscope under test;

identifying, among the set of points identified in step 208, the point value of the first compensation voltage $V_1$ that generates a compensation quadrature $Q_{el}$ compensating the quadrature error $Q_y$ on the basis of Eqs. [3] and [4], step 210;

identifying the point value of the second compensation voltage $V_2$ from the curves identified in step 208 or using Eq. [9], step 212; and storing the pair of values of the compensation voltages $V_1$, $V_2$ in a memory associated to the gyroscope under test, as described hereinafter with reference to FIG. 11, step 214.

Figure 11:
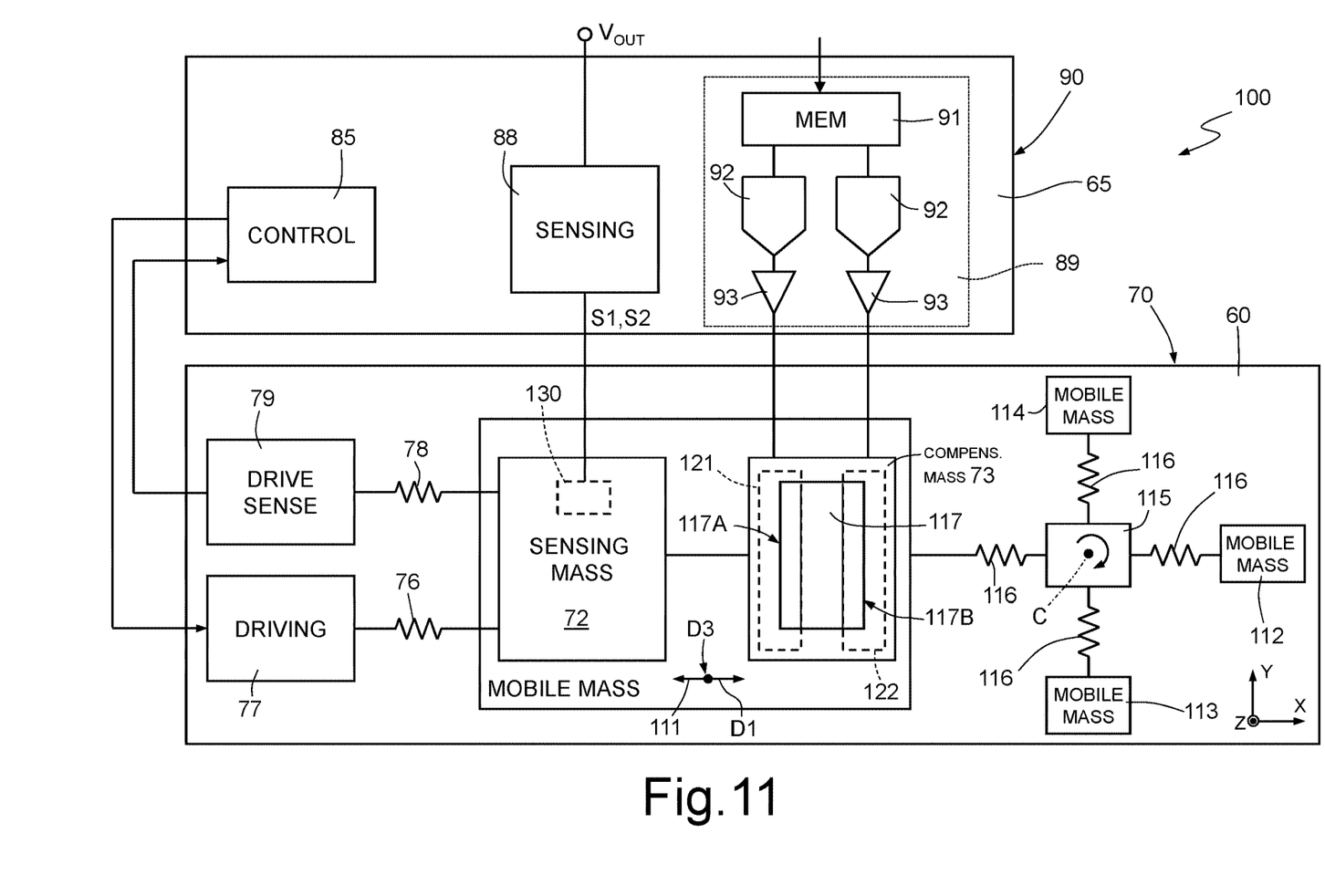
FIG. 11 shows a block diagram of a device including the gyroscope of FIG. 6B and a control part.

FIG. 11 shows a block diagram of an electronic device 100 using the frequency-mismatch compensation principle described above.

In FIG. 11, the electronic device 100 comprises the gyroscope 60, here represented via its functional blocks and a control element 65.

The gyroscope 60 is integrated in a semiconductor chip 70 represented schematically and has a same structure as gyroscope 10 of FIG. 2. Thus, the elements described with reference to FIG. 6B are designated by the same reference numbers. In detail, the central mass 115 is anchored to a substrate not shown (similar to the substrate 125 of FIG. 6B) rotatable about an axis perpendicular to the gyroscope 60 (parallel to the axis Z) and extending through the center C. The central mass 115 is coupled, via the first springs 116, to four mobile masses 111-114, only one whereof (the mobile mass 117) being represented in greater detail in FIG. 11. The mobile masses 111-114 are arranged symmetrically, in pairs, with respect to the center C and, in the resting condition, extend parallel to the drawing plane (plane XY), as for the gyroscope of FIG. 2. The mobile masses 111-114 have two degrees of freedom and are subjected to a driving motion along a respective driving axis and to a sensing motion having a component along a respective sensing axis perpendicular to the driving axis. The mobile masses 111-114 thus have basic structures that are similar but are configured to detect movements about different axes, in a per se known manner. The description thus refers just to the mobile mass 111 shown in greater detail, but may be applied also to the other mobile masses 112-114, mutatis mutandis.

In particular, the mobile mass 111 is subjected to a driving motion along driving axis D1 parallel to axis X and to a sensing motion, having a component along sensing axis D3 parallel to axis Z.

The mobile mass 111 is here represented schematically by a sensing mass 72 and a compensation mass 73, rigid with respect to each other. The sensing mass 72 may have a generally trapezoidal shape as shown in FIG. 2 of U.S. patent application 2015/0114112. The compensation mass 73 has a generally hollow rectangular shape, overlying the pair of compensation electrodes 121, 122. In particular, the opening 117 is formed in the compensation mass 73 and has two sides 117A, 117B parallel to axis Y. Each compensation electrode 121, 122 extends along a respective side 117A, 117B of the opening 117, half underneath the compensation mass 73 and half underneath the opening 117.

The mobile mass 111 is connected, via second springs 76 that enable the sensing movement, to an actuation module 77, which drives the mobile mass 111 in the driving direction D1 and, through third springs 78, to a module for sensing the driving movement 79, having the task of detecting the effective driving parameters, including the driving frequency $f_d$, as discussed above.

The actuation module 77 and the module for sensing the driving movement 79 are connected to a driving-control module 85 formed in the control element 65. The control element 65 is generally integrated in a different chip 90 and comprises, for example, an ASIC (application-specific integrated circuit).

The control element 65 further comprises a sensing module 88 connected to the sensing electrodes 130 and configured to determine the motion of the gyroscope based on the voltage signals s1, s2 received from the sensing electrodes. The control element also includes a compensation controller 89 that provides to the compensation electrodes the compensation voltages $V_1$, $V_2$ as described above to drive the mobile mass at a preset frequency mismatch. In FIG. 11, the compensation controller 89 includes a parameter memory 91, storing the values of the compensation voltages $V_1$, $V_2$ calculated during testing, as discussed above, and also includes DACs 92 and buffers 93. The DACs 92 form voltage sources, each configured to apply a compensation voltage $V_1$, $V_2$, the values whereof are specified by the contents of the memory 91.

Figure 12:
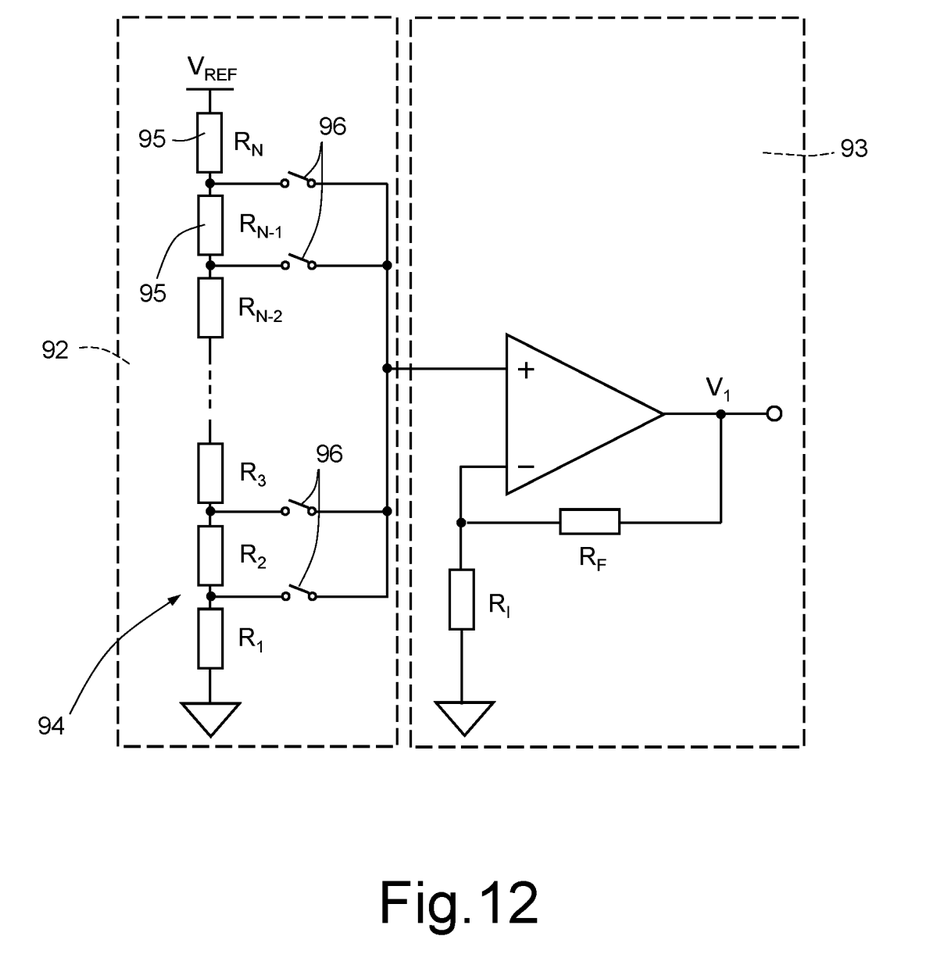
FIG. 12 shows a circuit diagram of driving components of the gyroscope of FIG. 6B.

For example, each DAC 92 and the associated buffer 93 may be made as shown in FIG. 12. In practice, in the embodiment shown, the DAC 92 is formed by a resistive divider 95 coupled between a reference voltage $V_{REF}$ and mass and comprising a plurality of resistors 96, which may be coupled to the buffer 93 through switches 97 driven on the basis of the contents of the memory 91.

The MEMS gyroscope 60 described herein thus enables regulation of the frequency mismatch in an electrostatic way using the same electrodes regulating quadrature error and thus has reduced dimensions and low consumption levels.

Figure 13:
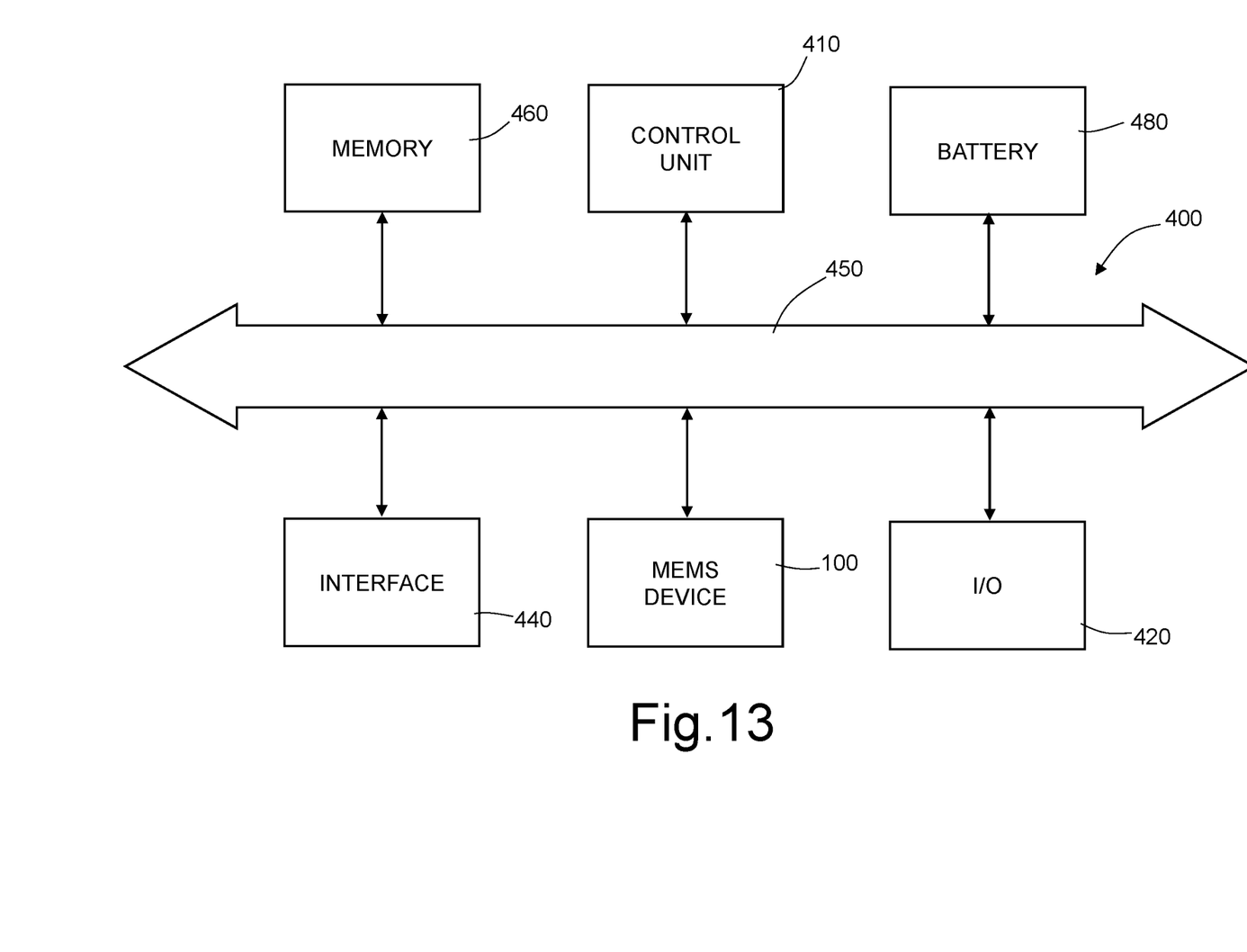
FIG. 13 shows a simplified block diagram of an electronic apparatus incorporating the gyroscope of FIG. 11.

FIG. 13 illustrates a portion of an electronic system 400 that incorporates the electronic device 100 and may be used in apparatuses such as a palmtop computer (personal digital assistant, PDA), a laptop or portable computer, possibly with wireless capacity, a cellphone, a messaging device, a digital music player, a digital camera or other apparatuses designed to process, store, transmit, or receive information. For example, the electronic device 100 may be used in a digital camera for detecting movements and carry out image stabilization. In a possible embodiment, the electronic device 100 is included in a motion-activated user interface for computers or consoles for videogames. In a further embodiment, the electronic device 100 is incorporated in a satellite-navigation device and is used for temporary position tracking in case of loss of a satellite-positioning signal.

The electronic system 400 of FIG. 13 comprises a control unit 410, an input/output (I/O) unit 420 (for example, a keypad or a display), the electronic device 100, a wireless interface 440 and a memory 460, of a volatile or nonvolatile type, coupled to each other through a bus 150. Alternatively, the memory 460 may be internal to the control unit 410 or may replace the memory 91 internal to the control element 65 of FIG. 11 and store the parameters and the quantities usable for operating the electronic device 100, such as the compensation voltages $V_1$, $V_2$. In one embodiment, a battery 480 may be used for supplying the system 400. The electronic system 400 may, however, comprise even only some of the units shown in FIG. 13.

The control unit 410 may comprise, for example, one or more microprocessors, microcontrollers and the like. In a different embodiment, it may integrate the functions of the control element 65 of FIG. 11 and the electronic device 100 of FIG. 13 may be formed by the gyroscope 60.

The I/O unit 420 may be used for generating a message. The electronic system 400 may use the wireless interface 440 for transmitting and receiving messages to and from a wireless communication network (not shown) with a radiofrequency (RF) signal. Examples of wireless interface may comprise an antenna, a wireless transceiver, such as a dipole antenna, even though the scope of the present disclosure is not limited thereto. Further, the I/O unit 420 may supply a voltage representing what is stored either as a digital output (if digital information has been stored) or as an analog output (if analog information has been stored).

Finally, it is clear that modifications and variations may be made to the gyroscope, the control method and the regulation method described and illustrated herein, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A MEMS gyroscope, comprising:
   a supporting structure;
   a mobile mass mobile with respect to the supporting structure in a driving direction and in a sensing direction, the driving direction and the sensing direction being perpendicular to each other, the mobile mass being affected by a quadrature error caused by a quadrature moment;
   a driving structure coupled to the mobile mass and configured to control movement of the mobile mass in the driving direction at a driving frequency, the mobile mass having a variable resonance frequency that differs from the driving frequency by a frequency mismatch;
   motion-sensing electrodes coupled to the mobile mass and configured to detect movement of the mobile mass in the sensing direction; and
   quadrature-compensation electrodes coupled to the mobile mass and configured to generate a compensation moment opposite to the quadrature moment; and
   a compensation controller configured to bias the quadrature-compensation electrodes with at least one compensation voltage that drives the mobile mass at a preset frequency mismatch, wherein the quadrature-compensation electrodes comprise a first quadrature-compensation electrode and a second quadrature-compensation electrode, and the compensation controller is configured to bias the first and second quadrature-compensation electrodes at first and second compensation voltages $V_1$, $V_2$, respectively, where $V_1$ and $V_2$ are chosen for satisfying the equation:

$$\Delta f_0 = \frac{1}{2\pi}\sqrt{\omega_{S0}^2 - \frac{k_S}{J}[(V_R - V_1)^2 + (V_R - V_2)^2]} - f_d$$

where:
$\Delta f_0$ is the preset frequency mismatch;
$V_R$ is a biasing voltage of the mobile mass;
$\omega_{S0}$ is a resonance frequency of the mobile mass;
$k_s/J$ is a parameter correlated to mechanical constants of the mobile mass; and
$f_d$ is the driving frequency.

2. The gyroscope of claim 1, wherein the at least one compensation voltage is variable quadratically with the quadrature error.

3. The gyroscope of claim 1, wherein the first and the second compensation voltage $V_1$, $V_2$ satisfy the equation:

$$Q_{el} + Q_\gamma = 0$$

wherein:
$Q_{el}$ is a compensation quadrature given by:

$$Q_{el} = k_Q[(V_R - V_1)^2 - (V_R - V_2)^2],$$

$Q_\gamma$ is the quadrature error,
$k_q$ is a proportionality constant linking the compensation quadrature $Q_{el}$ to the compensation moment $M_{el}$.

4. The gyroscope of claim 1, wherein the compensation controller includes a memory element configured to store values of the at least one compensation voltage.

5. A control method for controlling a MEMS gyroscope, comprising:
driving a mobile mass in a driving direction and at a driving frequency;
detecting a movement of the mobile mass in a sensing direction, perpendicular to the driving direction, wherein the mobile mass is affected by quadrature error caused by a quadrature moment in the sensing direction and having a variable resonance frequency, the difference between the resonance frequency and the driving frequency forming a frequency mismatch;
generating a compensation moment opposite to the quadrature moment via quadrature-compensation electrodes coupled to the mobile mass; and
biasing the quadrature-compensation electrodes with at least one compensation voltage that drives the mobile mass with a preset frequency mismatch, wherein biasing the quadrature-compensation electrodes comprises applying a first compensation voltage $V_1$ to a first quadrature-compensation electrode and applying a second compensation voltage $V_2$ to a second quadrature-compensation electrode and $V_1$ and $V_2$ satisfy the equation:

$$\Delta f_0 = \frac{1}{2\pi}\sqrt{\omega_{S0}^2 - \frac{k_S}{J}[(V_R - V_1)^2 + (V_R - V_2)^2]} - f_d$$

where:

$\Delta f_0$ is the preset frequency mismatch;
$V_R$ is a biasing voltage of the mobile mass;
$\omega_{S0}$ is a resonance frequency of the mobile mass;
$k_s/J$ is a parameter correlated to an elastic constant of the mobile mass; and
$f_d$ is the driving frequency.

6. The method of claim 5, wherein the at least one compensation voltage is variable quadratically with the quadrature error.

7. The method of claim 5, wherein the first quadrature-compensation voltage $V_1$ and the second quadrature-compensation voltage $V_2$ satisfy the equation:

$$Q_{el} + Q_\gamma = 0$$

where:
$Q_{el}$ is a compensation quadrature given by:

$$Q_{el} = k_Q[(V_R - V_1)^2 - (V_R - V_2)^2]$$

$Q_\gamma$ is the quadrature error;
$k_q$ is a proportionality constant that links the compensation quadrature $Q_{el}$ to the compensation moment $M_{el}$.

8. A method for setting compensation parameters in a MEMS gyroscope, comprising:
driving a mobile mass of the MEMS gyroscope in a driving direction and at a driving frequency;
applying a plurality of pairs of values of compensation voltages $V_1$, $V_2$ to a first quadrature-compensation electrode and a second quadrature-compensation electrode coupled to the mobile mass and detecting a corresponding plurality of frequency mismatch values $\Delta f_0$ between the driving frequency and a resonance frequency of the mobile mass;
detecting, from the plurality of frequency mismatch values, which of the pairs of values of the compensation voltages $V_1$, $V_2$ are associated with a desired frequency mismatch value $\Delta f_{0d}$;
detecting, from the pairs of values of the compensation voltages, which pair of values makes $Q_{el} + Q_\gamma = 0$
wherein:
$Q_{el}$ is a compensation quadrature given by:

$$Q_{el} = k_Q[(V_R - V_1)^2 - (V_R - V_2)^2],$$

$Q_\gamma$ is quadrature error,
$V_R$ is a biasing voltage of the mobile mass, and
$k_q$ is a proportionality constant linking the compensation quadrature $Q_{el}$ to the compensation moment $M_{el}$; and
storing the pair of values of the compensation voltages $V_1$, $V_2$ that makes $Q_{el} + Q_\gamma = 0$.

9. The method of claim 8, wherein detecting a corresponding plurality of values of frequency mismatch $\Delta f_0$ comprises solving equation:

$$\Delta f_0 = \frac{1}{2\pi}\sqrt{\omega_{S0}^2 - \frac{k_S}{J}[(V_R - V_1)^2 + (V_R - V_2)^2]} - f_d$$

wherein:
$\Delta f_0$ is the preset frequency mismatch;
$\omega_{S0}$ is a resonance frequency of the mobile mass;
$k_s/J$ is a parameter correlated to an elastic constant of the mobile mass; and
$f_d$ is the driving frequency.

10. The method of claim 8, further comprising:
measuring a driving frequency $f_d$ of the mobile mass in a driving direction through a driving measurement structure coupled to the mobile mass; and measuring the sensing resonance frequency $\omega_{S0}$ and measuring the parameter $k_s/J$ by applying appropriate values of the compensation voltages $V_1$, $V_2$.

11. The method of claim 8, wherein applying a plurality of pairs of compensation voltage values $V_1$, $V_2$ and detecting a corresponding plurality of values of frequency mismatch $\Delta f_0$ comprises:
generating a table of frequency mismatch values $\Delta f_0$.

12. An electronic system comprising:
a MEMS gyroscope including:
a supporting structure;
a mobile mass mobile with respect to the supporting structure in a driving direction and in a sensing direction, the driving direction and the sensing direction being perpendicular to each other, the mobile mass being affected by a quadrature error caused by a quadrature moment;
a driving structure coupled to the mobile mass and configured to control movement of the mobile mass in the driving direction at a driving frequency, the mobile mass having a variable resonance frequency that differs from the driving frequency by a frequency mismatch;
motion-sensing electrodes coupled to the mobile mass and configured to detect movement of the mobile mass in the sensing direction; and
quadrature-compensation electrodes coupled to the mobile mass and configured to generate a compensation moment opposite to the quadrature moment; and
a control unit that includes a compensation controller configured to bias the quadrature-compensation electrodes with at least one compensation voltage that drives the mobile mass at a preset frequency mismatch, wherein the quadrature-compensation electrodes comprise a first quadrature-compensation electrode and a second quadrature-compensation electrode, and the compensation controller is configured to bias the first and second quadrature-compensation electrodes at first and second compensation voltages $V_1$, $V_2$, respectively, where $V_1$ and $V_2$ are chosen for satisfying the equation:

$$\Delta f_0 = \frac{1}{2\pi}\sqrt{\omega_{s0}^2 - \frac{k_S}{J}[(V_R - V_1)^2 + (V_R - V_2)^2]} - f_d$$

where:
$\Delta f_0$ is the preset frequency mismatch;
$V_R$ is a biasing voltage of the mobile mass;
$\omega_{S0}$ is a resonance frequency of the mobile mass;
$k_s/J$ is a parameter correlated to mechanical constants of the mobile mass; and
$f_d$ is the driving frequency.

13. The electronic system of claim 12, wherein the at least one compensation voltage is variable quadratically with the quadrature error.

14. The electronic system of claim 12, wherein the first and the second compensation voltage $V_1$, $V_2$ satisfy the equation:

$Q_{el}+Q_\gamma=0$ wherein:
$Q_{el}$ is a compensation quadrature given by:
$Q_{el}=k_Q[(V_R-V_1)^2-(V_R-V_2)^2]$,
$Q_\gamma$ is the quadrature error,
$k_q$ is a proportionality constant linking the compensation quadrature $Q_{el}$ to the compensation moment $M_{el}$.

15. The electronic system of claim 12, wherein the compensation controller includes a memory element configured to store values of the at least one compensation voltage.

* * * * *